Patented Feb. 17, 1948

2,436,328

UNITED STATES PATENT OFFICE 2,436,328

PHENOL FORMALDEHYDE RESIN-GLYCININ PROTEIN EMULSION

Philip K. Porter, Pittsburgh, Pa., assignor to Westinghouse Electric Corporation, East Pittsburgh, Pa., a corporation of Pennsylvania No Drawing. Application March 24, 1942, Serial No. 435,969

4 Claims. (Cl. 260—7)

This invention relates to resinous compositions comprising partially reacted phenol-aldehyde resins and a fibrous filler and methods of preparing compositions of this type. More particularly, the invention relates to non-sticky compositions comprising a distribution of finely divided potentially reactive resin in a mass of fibers which may be preformed into predetermined shape and molded under heat and pressure.

It has been proposed heretofore to combine a mixture of fibrous material with potentially reactive resins in a beater apparatus, the materials being so distributed that upon dewatering the fibrous furnish and the resins, a composition is obtained suitable for curing under heat and pressure into molded material. For instance, the patent to Cheetham No. 1,855,384 discloses that an emulsion of a phenolic-resin may be prepared and added to a furnish in a beater and, upon breaking the emulsion, the resin is precipitated about the fibers and the mixture may be dewatered by running on a screen and forming sheets.

The fundamental defect in proposals of this kind which so far has rendered the processes commercially impractical resides in the fact that in the precipitation of the phenolic resin upon breaking the emulsion, the resin particles become sticky and adhere to the beating apparatus. Furthermore, the resin particles remain quite sticky and gummy and when being run onto a screen or other device capable of dewatering the pulp, the gummy resin particles clog up the screens and other apparatus so that in a short time the sheet forming apparatus is rendered inoperative.

In addition to the undesirable physical properties of the precipitated resin, such as gumminess, the particles of resin are exposed to the atmosphere, and being in a potentially reactive state, with an extensive exposed surface, their relative greenness, that is moldability and flow under heat and pressure, decreases with great rapidity. Therefore, sheets formed from the fibrous pulp and the resin cannot be stored and must be immediately molded, otherwise weak products with blotchy surfaces due to poor resin distribution and low greenness are obtained. Other defects in the prior art suggestions of preparing compositions from fibrous furnish and resin emulsions are inherent and render the process impractical to such an extent that no moldings have been produced in any quantity in commercial practice by such process up to the present time.

The object of this invention is to provide for utilizing proteins for emulsifying resins to facilitate the mixing of the resins with a fibrous furnish in the preparation of a moldable resinous composition.

Another object of the invention is to provide for finely distributing in a furnish particles of partially reacted phenolic resins in a non-sticky state, the particles being adapted for incorporation into the furnish.

Another object of the invention is to provide for distributing a non-sticky resin in the finely divided, partially reacted state in a fibrous furnish in the process of beating.

Other objects will, in part, be obvious and will, in part, appear hereinafter in the specification and claims.

According to this invention, these defects, particularly the sticky and gummy nature of the precipitated resin dispersoid and the rapid deterioration in greenness, can be avoided and highly satisfactory results produced by employing a particular type of protein in preparing an emulsion of resin. In particular, it has been discovered that the proteins should be glycinins which have been derived from a proteinaceous source, particularly from soybeans, in such a manner that the protein has undergone as little change as possible during the process of isolation. Substantially unmodified glycinin has been found to operate very successfully in the process. Other proteins of a similar nature which have been subjected to extraction processes which modify the structure of the glycinin only to a slight extent have also been found to give satisfactory results.

The characteristics of the glycinin proteins suitable for the purpose of this invention which serve to distinguish them from other proteins which do not function as well are as follows: Preferred glycinin proteins have an isoelectric point at a pH of about 4.3 to 4.7. In water at this pH the protein reaches its minimum solubility. A further characteristic of the preferred glycinin protein is its relative solubility. Upon adding 45 grams of the glycinin protein to 400 c. c. of distilled water at 25° C. at a pH of 8.5 secured with dilute sodium hydroxide, with stirring during the addition, the maximum solubility occurs at a concentration ranging from 2% to 20%. In the case of a protein which has been obtained with a minimum of modification from a source thereof, the solubility under the above test will vary from 6½% to 8%. In the case of a slightly more modified glycinin protein, the solubility was greater and the saturated solutions contained 12 to 15% of the protein. Viscosity tests of the preferred types of glycinin proteins were made by dissolving 30 grams of protein in 400 c. c. of distilled water rendered alkaline to a pH of 8.5 with sodium hydroxide, and at 25° C. After being clarified of insoluble and undissolved fractions by centrifuging at the end of two hours, the solutions showed a viscosity varying from 1 to 40 centipoises. The least modified proteins had viscosities ranging from 20 to 40 centipoises. Other slightly modified glycinin proteins operative in the process formed similar solutions having a viscosity of from 1 centipoise and upward. The concentration of protein in the clarified solutions employed as the basis for viscosity tests were from 5% to 7% based on the factor (percent of N) ×6.25.

The glycinin proteins need not be free from extraneous portions of the material from which it has been derived. It has been found that from 1% to 30% insoluble matter may be present in the protein without untoward effects resulting. These relatively insoluble constituents do not function as do the soluble protein portions and accordingly allowance must be made by adding greater quantity of proteins in the process.

The preferred glycinin proteins are available commercially. For example, a suitable protein is sold to the trade under the name of alpha soybean protein. Other proteins having the properties specified herein have been prepared by manufacturers and have been employed in the process with successful results being obtained.

In preparing an emulsion to be introduced into a beater along with a fibrous furnish, a quantity of water is rendered alkaline to a pH of from 8.5 to 11 or even higher by the addition of an alkali or other basic substances such as amines. Ammonium hydroxide is particularly good for this purpose, since it peptizes the glycinin protein somewhat better than other alkalies. The alkaline state is necessary in order to peptize the protein. The protein is introduced into the alkaline aqueous solution at room temperature or slightly higher and thoroughly agitated until it is substantially dissolved. A phenol-aldehyde type resin varnish, preferably in a water soluble solvent, is introduced into the aqueous protein solution in fine streams and subjected to mechanical forces to break up the resin into fine particles. A colloid mill or a gear pump is a suitable means for breaking up the resin into a sufficiently fine state. The resin will lose solvent rapidly to the water and form minute particles which are emulsified in the presence of the glycinin protein. It is the form of a stable emulsion which may be stored for a period of a month or more without breaking.

The emulsion is a thick fluid mixture in which the aqueous medium consists of water and the resin solvent and perhaps some glycinin protein. The aqueous medium constitutes the continuous phase of the emulsion while the suspended resin particles protected by the protein constitute the dispersed phase. Since the water is the continuous phase, it may be greatly diluted without the emulsion breaking providing, of course, that the alkalinity is not so greatly reduced that the protein loses its protective characteristics.

When peptized, the protein acquires characteristics rendering it a good emulsifying agent and protective colloid. Upon the introduction of the phenolic resin into a peptized protein solution, the fine resin particles acquire a protective film or layer of protein which prevents the resin particles from coagulating or becoming sticky. The resin particles are so fine that they remain suspended and do not settle out.

In preparing the emulsion of resin, protein and water, it has been found that alkaline conditions are necessary in order to properly peptize the glycinin protein. Most alkalies containing the hydroxyl group or other substances capable of acquiring hydroxyl groups upon being put into water will be satisfactory for the purpose. The ammonium radical is also a good peptizing agent. Accordingly, ammonium compounds of all types may be added to the water in an alkaline condition at a pH of 8.5 or higher to produce satisfactory peptization. Since ammonium hydroxide combines both the hydroxyl grouping and the ammonium group, it is a more efficient peptizing agent than an equivalent amount of many other materials.

In many cases, the emulsion may include conventional emulsifying agents, such as soaps and long chain aliphatic hydrocarbons, such as oleic acid, stearic acid and palmitic acid. Sodium soaps, ammonium soaps and potassium soaps of oleic, stearic and palmitic acids are examples of suitable soaps for this purpose. A small percentage of a soap or long chain hydrocarbon added to the water prior to the addition of the resin will assist in forming an emulsion of the resin.

Phenol-aldehyde resins to be used in producing an emulsion may be prepared by reacting phenols, for example, one mol of cresylic acid, meta-para cresol or other phenol with from less than 0.8 mol to 1.7 mols, or even higher, of an aldehyde such as formaldehyde or other methylene containing body. The phenol and aldehyde may be reacted in the presence of a catalyst, such as alkali hydroxides, phosphates, or carbonates, amines, acids and the like. The phenol aldehyde resin after reaction may be dehydrated by vacuum treatment or decantation. A thick resin composition in the A stage results which is soluble in ethyl alcohol or other solvent. Commonly, approximately an equal weight of alcohol is added to the resin in the vessel and a resin solution, or, as it is usually called in the art, a varnish, is produced. Since the solvent will enter into the water phase of the emulsion and later be greatly diluted in the water, in a beater, its recovery is not feasible, and, therefore, the minimum of solvent necessary to produce a varnish is preferably employed. The main criterion for the solvent is solubility in water whereby the dispersed particles of resin in the emulsion are rendered free of solvent.

A specific emulsion was produced by adding 10 parts of concentrated ammonium hydroxide of a specific gravity of 0.9 to 140 parts of water and 5 parts of dry powdered glycinin protein derived from soybeans without any substantial modification in its extraction and conforming to the characteristics set forth herein was added to the ammoniated water. After thorough stirring to dissolve the glycinin protein, 160 parts of a cresylic acid-formaldehyde varnish comprising 80 parts of solid resin by weight and 80 parts of ethyl alcohol solvent was added to the aqueous medium containing the peptized protein. The phenolic resin varnish was added as a thin stream and subjected to mechanical forces during the addition of the varnish. A gear pump was employed to break up the resin into the finest particles. The emulsion was drawn from the bottom of a containing receptacle, run through the gear pump and discharged into the top of the receptacle. In a short time, the resin was finely dispersed to a thick emulsion. The emulsion contained approximately 25% of solid phenol-aldehyde resin and 1½% of solid protein. The ratio of weight of solid phenol aldehyde to weight of the protein was 16 to 1.

Larger proportions of phenol aldehyde to protein, for example, 80 parts of solid resin to 1 part of protein have been made into an emulsion with satisfactory results. For most purposes emulsions ranging from a 80 to 1 to a 16 to 1 ratio are quite satisfactory. The proportion of phenol-aldehyde to protein will depend to some extent upon the type of protein being employed, the type of phenol resin being emulsified and the degree of stability desired. With a 16 to 1 ratio, the emulsion did not break in storage for months. In cases the emulsion is used immediately after preparation, the stability for long periods is not material, and much less protein than for a 16 to 1 ratio may be employed. In cases where other emulsifying agents such as the oleic acid or sodium stearate are employed, the lesser quantities of protein may be employed with satisfactory results. In subsequent steps, however, the protein plays an important part and it should not be reduced too low on this account.

In preparing the emulsion, it is desirable, as a matter of economy, to employ as small a quantity of water as is feasible since less material will be handled. In my copending application No. 435,970 filed March 4, 1942, due to the greater quantities of glycinin protein employed in producing the emulsion, it has been found that the amount of protein is determinative of the minimum amount of water required in its preparation. In the present case where the resin is present in greater proportions a different factor is dominant.

It has been found that the minimum amount of water is dependent upon the alcohol, or other water soluble solvent, in the resin varnish. If too much alcohol is present in the water the emulsion does not form satisfactorily. Tests have indicated that the alcohol content of the water should be less than 53%—preferably below 48%. Therefore, if a varnish consisting of 80 parts of phenol-aldehyde resin solids and 80 parts of alcohol is to be successfully emulsified, the water should total 80 parts or more.

A second consideration bearing on the amount of water employed in preparing the emulsion is the relative viscosity of the emulsion. Heavy emulsions are not as suitable for adding to a beater as are thin emulsions. If the resin to protein ratio is 16 to 1, greater amounts of water are required to produce an easily handled emulsion. Thus an emulsion containing 70 parts of water, 10 parts of ammonium hydroxide, 1½ parts of protein, and 160 parts of a resin varnish composed of 50% solvent is a thin fluid suitable for easy pouring into a beater. The same composition with 5 parts of glycinin protein is relatively thick fluid of the consistency of heavy molasses. Therefore, a composition with the proportions of 90 parts of water, 10 parts of ammonium hydroxide, and 5 parts of glycinin protein has been found most suitable for use with 160 parts of a 50% phenolic resin solids varnish to produce an emulsion of satisfactory consistency. It should be noted that the total water content in these examples includes the water present in the ammonium hydroxide and the term "water" when used in this connection refers to the total added water.

The fibrous filler to be combined with the phenol-aldehyde resin emulsion is put first into a beater containing water. A convenient and economical source of this material is wood pulp. Pulp is added in small quantities to the beater to form a furnish until a concentration of pulp ranging from 2% to 8% is attained. Best results have been obtained, however, when the pulp concentration is from 4% to 6%. The 8% concentration is quite heavy to handle and, on the other hand, the handling of a 2% concentration is not as economical from a manufacturing standpoint.

Cellulose pulp, in general, will be found to be most satisfactory for the purpose of the invention. This may include all types of wood pulp, shredded cloth, various plant fibers, and similar materials. Cellulose materials carry a negative charge, even when acid, and as will be shown this is an important characteristic in the successful functioning of the process. In addition, the fibrous material may be given predetermined properties by adding small amounts of inorganic material, preferably fibrous, such as asbestos.

As the fibrous furnish in the beater is subjected to beating in order to break up and hydrate the fibers, the emulsion of resin prepared as described above is introduced in a thin stream adjacent the beater cylinder. The emulsified particles of resin with their protective coating of protein will be uniformly distributed throughout the beater stock as the beating proceeds.

The emulsion may be broken or precipitated at any time during the beating operation. It is preferred, however, to precipitate the emulsion soon after its thorough distribution in the beater by adding a precipitant. In general, the protective colloid of protein will cease functioning as a protective colloid for the emulsion when the beater liquid is made acid. The isoelectric point of the protein, at a pH of from 4.3 to 4.7, is the preferable condition for the beater liquid. Accordingly, an acid or an acidic substance capable of producing a pH of 4 or slightly higher is added. It is particularly undesirable to permit the pH to fall below 4 since the protein becomes gummy and sticky when so acidified and will adhere to the beater mechanism and produce undesirable results.

Suitable precipitants are strong mineral acids, as, for example, sulphuric acid or hydrochloric acid. In addition, acidic compounds such as aluminum sulphate, acid phosphates, acid tartrates, and the like have functioned satisfactorily.

The reaction of the protein upon being acidified is twofold. The first change is a break of the emulsion. Further, as the isoelectric point is approached, the protein attached to the resin particles forms into a hard, insoluble film or coating about the resin particles. This acid hardened protein coating protects the potentially reactive phenol-aldehyde resin from deterioration, and further prevents the formation of sticky or gummy masses of resin. Therefore, not only does the protein function to prevent the resin particles from agglomerating into masses unsuitable for molding purposes, but the protein likewise prevents the resin from adhering to the beater mechanism or going to wsate.

In precipitating the emulsion with various agents, it has been found that aluminum sulphate is a highly efficient hardening and demulsifying agent. The protein forms a much harder film or coating when aluminum sulphate is used than with most other materials. On the other hand, the strong mineral acids maintain the acidity constant between a pH of 4 and 5 better than less strong acids. Therefore, for some purposes, it has been found that the use of a strong acid, for example, sulphuric acid, to bring the beater stock to a pH of below 7 and thereafter adding aluminum sulphate to attain a pH of from 4 to 5 is a desirable acidification step.

Under these conditions, the acid hardened glycinin protein coats the resin particles with a protective covering that keeps the resin in a reactable state while maintaining a predetermined greenness. The non-sticky nature of the fine resin particles so protected is a characteristic that was heretofore unattainable with prior art resin emulsifying materials. These features are highly important to successful results in the process. The appearance of the beater stock is that of a mass of fibers with finely pulverized brown sugar distributed therein, the protected resin particles having the appearance of brown sugar. For the purpose of this invention, a free draining pulp, such as is produced by one to two hours beating, has been found to be most satisfactory. More hydrated pulps secured by longer beating may, however, be used.

Since the isoelectric point of cellulose is much below that of the attainable acidity in the heater, the fibers carry a negative charge and beating has a tendency to increase this negative charge. For this resin, cellulosic pulps are preferred for the purpose of the invention because a negative charged fibrous pulp is a necessary feature of the process. The acidified protein protected resin particles carry a positive electrical charge and accordingly adhere to the cellulose fibers. This electrical attraction causing adherence is vital in order to obtain a high resin recovery from the beater. Without adherence to the fibers, the resin particles would easily wash out and be lost. It will be appreciated that a high resin recovery is necessary in producing an efficient and economical process.

The ratio of fibrous furnish to the resin solids may follow the proportions customarily employed in producing fibrous laminated resinous materials by conventional processes in the art. Thus 1.4 to 2.0 ratios or higher, will be found to give molding material which is suitable for equivalent purposes as conveniently prepared laminated stock.

The 2% to 8% beater stock is a heavy concentrated fibrous mass which is difficult to use for preparing sheets on paper-making machines or for performing to other shapes. Therefore, for most purposes, the beater stock is now diluted with water to a pulp concentration of about ½ to 1%. Such a thin fluid suspension of fibers and the adherent protected resin particles is more adapted for flowing onto the screens of paper-making machines or in building up shapes of all desirable kinds on perforated preformed members. During the processing, the beater stock is separated from the bulk of the water as the pulp-resin mixture is formed into predetermined shape. Preformed sheets of paper or preforms of other shapes may be further treated by means of pressure, with or without low heat at low temperatures, to remove most of the remaining quantities of water since water is undesirable in molding phenolic materials under heat and pressure to the infusible state.

The dried and dewatered sheets or preforms may now be placed within heated molds and subjected to curing pressure and heat. Pressures of from 500 pounds to 2000 pounds per square inch or even higher at temperatures ranging from 125° C. to 200° C. may be applied to the mixture of fibers and the adherent protein phenol-aldehyde resin particles. The heat causes the phenol-aldehyde resin particles to melt and become liquid, and in conjunction with the pressure, the protective protein envelope about each particle bursts and the liquid resin is distributed about the adjacent fibers. The protein is capable of reacting and probably does react with the resin to produce a modified resin whereby an increase in binding action is secured. However the amount protein present is so low that its effect is not appreciable. The potentially reactive resin rapidly changes over from the liquid to the infusible or C stage, and thereafter becomes effective as a solid binder between the fibers.

The following example of a particular furnish is exemplary of the invention: 100 pounds of pulp was put into a beater in 1667 pounds of water and 315 pounds of a protein resin emulsion containing 80 pounds of resin solids and 5.00 pounds of solid protein was added. After a few minutes operation, the beater furnish was acidified with sulphuric acid to a pH of 4.5 whereupon the emulsion precipitated. At the end of two hours beating the beater stock was diluted with approximately 10 times the quantity of water present and flowed over a paper screen. Sheets formed in this manner were molded at 2000 pounds per square inch and 160° C. The molded boards showed no areas of high and low resin content. The physical, chemical and mechanical properties of molded objects were quite satisfactory. The surface was glossy and quite uniform in color.

The resin recovery of the total recoverable resin solids was above 95%. It is believed that this resin recovery is exceptional for this type of process and renders the process satisfactory for commercial usage. The beater mechanism was not gummed up, the apparatus being substantially as clean after beating as before. Several hundred sheets of the composite resin fiber material were molded on the same screen, and no observable clogging or gumming up of the screens occurred. Accordingly, the protective effect of the glycinin protein or the phenol-aldehyde resin renders the process practical.

While the preparation of emulsions by application of the glycinin proteins to phenol-aldehyde resins has been specifically described, emulsions may be similarly prepared from modified phenol-aldehyde resins such, for example, as tung oil-phenol-aldehyde resins. Other thermosetting resins such as the furfural resins may also be as readily emulsified for application to fibers in a beater.

Since certain obvious changes may be made in the above procedure and different embodiments of the invention could be made without departing from the scope thereof, it is intended that all matter contained in the above description shall be interpreted as illustrative and not in a limiting sense.

I claim as my invention:

1. The method of producing a relatively stable resinous emulsion which comprises, adding an alkali to at least 70 parts by weight of water to produce a pH of from about 8.5 to 11 adding from one to five parts by weight of a glycinin protein to the alkaline water solution, the glycinin being so derived from a proteinaceous source that a minimum of modification thereof occurs, the protein having an isoelectric point at a pH of 4.3 to 4.7 and soluble in water at a pH of 8.5 at 25° C. to produce saturated solutions at a concentration of 2% to 20%, the water being proportioned to provide at least 77 parts of water with one part of glycinin protein and at least 97 parts of water with five parts glycinin protein and adding a solution of 80 parts by weight of a partially reacted thermosetting phenol-aldehyde type resin in the alcohol soluble stage in solution in a water soluble solvent in such proportions to the alkaline water solution that the quantity of water soluble solvent is less than the quantity of water, the resin solution forming an emulsion and the glycinin providing for an emulsifying agent and a protective colloid.

2. The method of producing a relatively stable resinous emulsion which comprises, adding 10 parts by weight of aqueous ammonium hydroxide to at least 70 parts by weight of water to produce a pH from about 8.5 to 11, adding from one to five parts by weight of a glycinin protein to the alkaline water solution, the glycinin being so derived from a proteinaceous source that a minimum of modification thereof occurs, the protein having an isoelectric point at a pH of 4.3 to 4.7 and soluble in water at a pH of 8.5 at 25° C. to produce saturated solutions at a concentration of 2% to 20%, the water being proportioned to provide at least 77 parts of water with one part of glycinin protein and at least 97 parts of water with five parts glycinin protein adding a solution of 80 parts by weight of a partially reacted thermosetting phenol-aldehyde type resin in solution in a water soluble solvent in such proportions to the alkaline water solution that the water soluble solvent is less than the amount of water, and subjecting to mechanical forces to break up the resin into fine particles, the resin solution forming an emulsion and the glycinin providing for an emulsifying agent and a protective colloid.

3. A resinous emulsion characterized by good stability over a period of days comprising, in combination, at least 157 parts by weight of an aqueous medium containing less than 53% by weight of a water soluble organic solvent and the balance being water at a pH of from about 8.5 to 11 as the continuous phase, 80 parts by weight of a partially reacted thermosetting phenol-aldehyde resin in the alcohol soluble stage, the resin being soluble in a water soluble organic solvent, as the dispersed phase, the water soluble organic solvent being present in the continuous phase, and an emulsifying agent and protective colloid for the dispersed phenol-aldehyde resin comprising a glycinin protein peptized with ammonium hydroxide, the ratio of weight of the solid phenol-aldehyde resin to the weight of the protein ranging from about 80 to 1 to 16 to 1, the glycinin protein derived from soybeans with a minimum of modification and characterized by an isoelectric point at a pH of 4.3 to 4.7 and soluble in water at a pH of 8.5 at 25° C. to produce saturated solutions at a concentration of 2% to 20%.

4. A resinous emulsion characterized by good stability over a period of days comprising, in combination, at least 157 parts by weight of an aqueous medium containing less than 53% by weight of a water soluble organic solvent and the balance being water at a pH of from about 8.5 to 11, having a proportion of the water soluble phenol-aldehyde solvent as the continuous phase, 80 parts by weight of a partially reacted thermosetting phenol-aldehyde resin in the alcohol soluble stage, the resin being soluble in a water soluble organic solvent, as the dispersed phase, and an emulsifying agent and protective colloid for the dispersed phenol-aldehyde resin comprising a glycinin protein peptized with hydroxyl ions, the ratio of weight of the solid phenol-aldehyde resin to the weight of the protein ranging from about 80 to 1 to 16 to 1, the glycinin protein derived from soybeans with a minimum of modification and characterized by an isoelectric point at a pH of 4.3 to 4.7 and soluble in water at a pH of 8.5 at 25° C. to produce saturated solutions at a concentration of 2% to 20%.

PHILIP K. PORTER.

REFERENCES CITED

The following references are of record in the file of this patent:

UNITED STATES PATENTS

| Number | Name | Date |
| --- | --- | --- |
| 1,160,365 | Baekeland | Nov. 16, 1915 |
| 1,855,384 | Cheetham | Apr. 26, 1932 |
| 1,976,433 | Cheetham | Oct. 9, 1934 |
| 1,997,868 | Levin | Apr. 16, 1935 |
| 2,022,004 | Larson | Nov. 26, 1935 |
| 2,027,090 | Carter | Jan. 7, 1936 |
| 2,058,085 | Kress | Oct. 20, 1936 |
| 2,066,857 | Rozema et al. | Jan. 5, 1937 |
| 2,068,926 | Nevin | Jan. 26, 1937 |
| 2,172,392 | Kress et al. | Sept. 12, 1939 |
| 2,262,422 | Brother et al. | Nov. 11, 1941 |
| 2,264,732 | Weber | Dec. 2, 1941 |
| 2,271,620 | Brier et al. | Feb. 3, 1942 |
| 2,278,291 | Swan et al. | Mar. 31, 1942 |
| 2,311,244 | Novak | Feb. 16, 1943 |
| 2,325,302 | Britt | July 27, 1943 |
| 2,338,602 | Schur | Jan. 4, 1944 |

FOREIGN PATENTS

| Number | Country | Date |
| --- | --- | --- |
| 293,232 | Great Britain | July 5, 1928 |

OTHER REFERENCES

Mattiello, Protective and Decorative Coatings, vol. III, 1943, pages 482 to 484.

Technical Association Papers Series 23 (1940), page 379.